United States Patent
Gruen et al.

(10) Patent No.: US 12,293,474 B2
(45) Date of Patent: May 6, 2025

(54) VIDEO PASS-THROUGH COMPUTING SYSTEM

(71) Applicant: Microsoft Technology Licensing, LLC, Redmond, WA (US)

(72) Inventors: Robert Warren Gruen, Seattle, WA (US); Weige Chen, Redmond, WA (US); Michael George Boulton, Seattle, WA (US); Roberta Rene Moeur, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

(21) Appl. No.: 18/001,211

(22) PCT Filed: Apr. 19, 2021

(86) PCT No.: PCT/US2021/027948
§ 371 (c)(1),
(2) Date: Dec. 8, 2022

(87) PCT Pub. No.: WO2021/257172
PCT Pub. Date: Dec. 23, 2021

(65) Prior Publication Data
US 2023/0222741 A1    Jul. 13, 2023

(30) Foreign Application Priority Data
Jun. 19, 2020   (NL) ...................... 2025869

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/012* (2013.01);
(Continued)

(58) Field of Classification Search
CPC .......... G06T 19/006; G06T 5/80; G06T 1/20; H04N 13/344; H04N 23/73; G02B 27/0172; G02B 2027/0138; G06F 3/012
See application file for complete search history.

(56) References Cited

U.S. PATENT DOCUMENTS 9,674,435 B1   6/2017   Monari et al.
9,990,008 B2   6/2018   Passmore et al.
(Continued)

FOREIGN PATENT DOCUMENTS

WO    2016191467 A1    12/2016
WO    2017117675 A1    7/2017
(Continued)

OTHER PUBLICATIONS

Communication 71(3) Received for European Application No. 21723610.8, mailed on Mar. 18, 2024, 7 pages.
(Continued)

*Primary Examiner* — Xin Sheng
(74) *Attorney, Agent, or Firm* — Alleman Hall & Tuttle LLP

(57) ABSTRACT

A video pass-through computing system includes a head-mounted display device including a display, a camera configured to image a physical scene according to an exposure timing, and an augmented reality control circuit configured to receive a virtual image pixel stream and composite the camera image pixel stream with the virtual image pixel stream to generate a display image pixel stream output to the display, and if a corresponding pixel of the camera image pixel stream is not in temporal synchronization with a pixel of the virtual image pixel stream adjust the exposure timing of the camera.

20 Claims, 6 Drawing Sheets

(51) Int. Cl.
  *G06F 3/01*    (2006.01)
  *G06T 1/20*    (2006.01)
  *G06T 5/80*    (2024.01)
  *H04N 13/344*  (2018.01)
  *H04N 23/73*   (2023.01)

(52) U.S. Cl.
  CPC .................. *G06T 1/20* (2013.01); *G06T 5/80* (2024.01); *H04N 13/344* (2018.05); *H04N 23/73* (2023.01); *G02B 2027/0138* (2013.01)

(56) References Cited

U.S. PATENT DOCUMENTS

| | | | |
|---|---|---|---|
| 2008/0030429 | A1 | 2/2008 | Hailpern et al. |
| 2016/0035139 | A1* | 2/2016 | Fuchs .................. G06T 19/006 345/633 |
| 2017/0287215 | A1 | 10/2017 | Lalonde et al. |
| 2019/0281221 | A1* | 9/2019 | Kuwahara .............. H04N 5/265 |

FOREIGN PATENT DOCUMENTS

| | | |
|---|---|---|
| WO | 2018056473 A1 | 3/2018 |
| WO | WO-2019129475 A1 * | 7/2019 |

OTHER PUBLICATIONS

"Project PRISM", Retrieved from: https://web.archive.org/web/20181105154935/https://www.microsoft.com/en-us/research/project/prism/, Nov. 5, 2018, 5 Pages.

Gruen, et al., "Measuring System Visual Latency through Cognitive Latency on Video See-Through AR devices", In Proceedings of Conference on Virtual Reality and 3D User Interfaces, Mar. 22, 2020, pp. 791-799.

"Search Report Issued in Netherlands Application No. N2025869", Mailed Date: Jan. 27, 2021, 10 Pages.

"International Search Report and Written Opinion Issued in PCT Application No. PCT/US21/027948", Mailed Date: Jul. 14, 2021, 10 Pages.

Souppouris, Aaron, "How HTC and Valve built the Vive", Retrieved from: https://www.engadget.com/2016-03-18-htc-vive-an-oral-history.html, Mar. 18, 2016, 15 Pages.

* cited by examiner

VIDEO PASS-THROUGH COMPUTING SYSTEM

CROSS REFERENCE TO RELATED APPLICATIONS

The present application is a U.S. National Phase of International Patent Application Serial No. PCT/US2021/027948, filed Apr. 19, 2021, which claims priority to Netherlands Patent Application Serial No. 2025869, filed Jun. 19, 2020, the entire contents of each of which are hereby incorporated by reference for all purposes.

BACKGROUND

A video pass-through head-mounted display device can include an opaque (or non-see-through) display that is viewed by a user and an outward-facing camera that images a real-world physical scene. A video stream is "passed through" the device from the camera to the display, such that the user views the physical scene through the video stream without viewing the physical scene directly. Furthermore, virtual imagery may be composited with the video feed from the camera to create an augmented reality (AR) experience. The opaque head-mounted display may have various advantages relative to an AR system with a see-through display. For example, the opaque head-mounted display may block out a majority of ambient light, such that a brightness and contrast of virtual imagery may be improved relative to showing such content on a see-through display.

SUMMARY

A video pass-through computing system includes a head-mounted display device including (1) a display, (2) a camera configured to image a physical scene according to an exposure timing, and (3) an augmented reality control circuit configured to (a) receive a virtual image pixel stream, (b) composite a camera image pixel stream from the camera with the virtual image pixel stream to generate a display image pixel stream output to the display, and (c) if a corresponding pixel of the camera image pixel stream is not in temporal synchronization with a pixel of the virtual image pixel stream, adjust the exposure timing of the camera.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
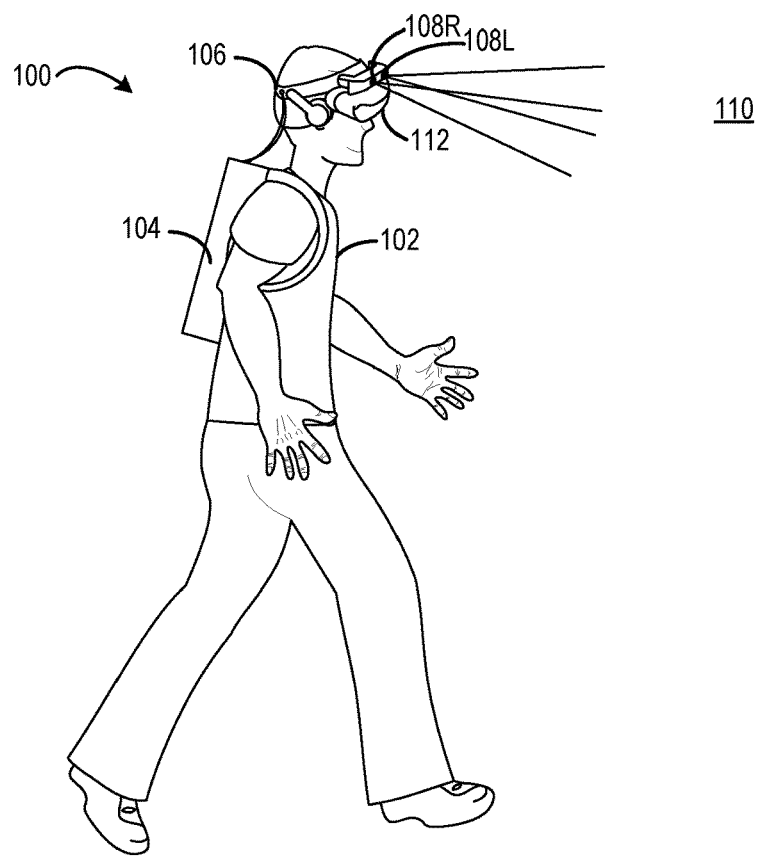
FIGS. 1A and 1B show an illustrative video pass-through computing system being worn by a user.

A video pass-through computing system may have various advantages over augmented reality (AR) systems with see-through displays that allow direct viewing of the outside world. For example, the performance of see-through displays may suffer outdoors or in other high ambient light conditions that can wash out virtual image light, such as light from a display waveguide. In contrast, typical video pass-through systems are very effective at blocking ambient light and preventing it from interfering with operation of the system's opaque display. Additionally, video pass-through systems may be configured to perform various image signal processing (ISP) operations to compensate for varying light conditions and otherwise enhance video stream image quality.

However, existing video pass-through computing systems typically suffer from high latency between video capture and display of an AR video stream. For example, an existing video pass-through computing system with a higher latency may display a video frame at least 50 milliseconds after capture of the video frame. One factor that contributes to such latency is image signal processing of the video stream being performed by a host computer. In such a configuration, a camera video stream is captured by a camera. The camera sends the camera video stream to the host computer, which typically buffers entire frames of video at a time for image signal processing to generate a processed video stream. The host computer sends the processed video stream to a head-mounted display device for display. The transmission of video between these different devices can encounter various system bottlenecks (e.g. full frame buffering, memory bandwidth), and can add computational overhead that increases latency. Such latency is perceived most readily when a user moves, when time is needed for the display to catch up with the user's motion. For example, if the user's head moves, the displayed content can lag, and unwanted artifacts may appear in connection with the orientation and position of the user's head. This can make the AR experience unpleasant and cause discomfort to the point of making the existing video pass-through computing system unusable for any significant amount of time.

The present disclosure is directed to a low-latency video pass-through computing system where image signal processing of a camera image pixel stream is performed at a sub-frame level directly in hardware. Such processing may be performed by an AR control circuit of a head-mounted display device, so as to produce a processed image pixel stream. A virtual image pixel stream is rendered by a host computer and sent to the AR control circuit. The AR control circuit composites the processed image pixel stream with the virtual image pixel stream to generate a composited display image pixel stream—i.e., containing both "real" pass-through content and virtual content—that is output to a display of the head-mounted display device. The AR control circuit is further configured to use feedback based on whether a corresponding pixel of the camera image pixel stream is not in temporal synchronization with a pixel of the virtual image pixel stream to temporally synchronize the real pass-through content with the virtual content to generate the composited display image pixel stream.

By performing image signal processing of the camera image pixel stream at a sub-frame level, waiting for an entire image frame to be buffered in hardware to begin signal processing is avoided. This can reduce latency of the video pass-through computing system relative to existing approaches. In some examples, image signal processing of the camera image pixel stream may be performed directly in hardware of the head mounted display, which may reduce transport overhead that further reduces latency. In some examples, latency can be lowered below a cognitive threshold of a user (e.g., ~10 milliseconds), such that the user does not perceive any lag in a displayed AR image pixel stream. Furthermore, by using feedback from compositing pixels of the camera image pixel stream and the virtual image pixel stream to control a timing at which the camera initiates image capture, the camera pixel image stream and the virtual image pixel stream may be properly temporally registered. In this way, an accurate AR experience may be displayed to the user, free of distortion and discomfort.

Figure 1B:
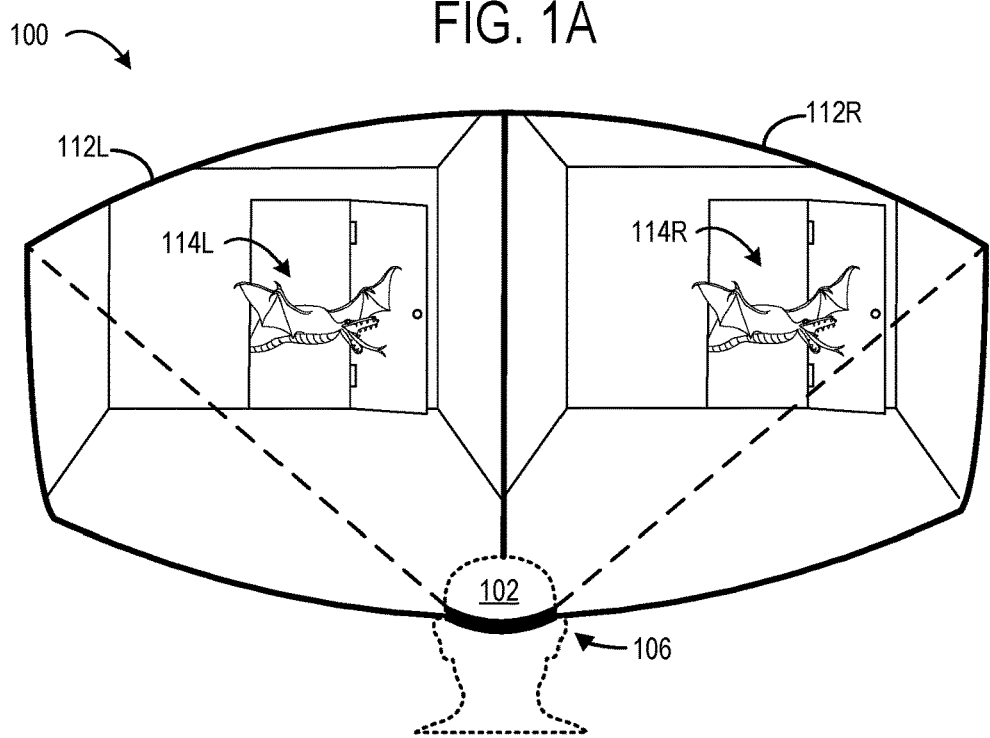

FIGS. 1A and 1B show aspects of an illustrative video pass-through computing system 100. In FIG. 1A, the video pass-through computing system 100 is worn by a user 102. The video pass-through computing system 100 includes a host computer 104 communicatively coupled to a head-mounted display device 106.

The head-mounted display device 106 includes, in this example, a pair of outward-facing stereo cameras 108 configured to image a real-world physical scene 110. For example, the cameras 108 may be color (e.g., RGB) cameras. A left camera 108L is configured to capture a left camera image pixel stream and a right camera 108R is configured to capture a right camera image pixel stream. Each camera pixel stream includes a plurality of pixels that make up one or more image frames. In some examples, the pixels of the camera pixel stream make up a sequence of image frames of a video stream. The left and right cameras 108L, 108R are configured to send the left and right camera image pixel streams to an AR control circuit (shown in FIG. 2) of the head-mounted display device 106 for image signal processing. In some implementations, the left and right camera image pixel streams may be "raw" image pixel streams that are minimally processed or not processed by the cameras 108 to help reduce latency of the system 100.

The host computer 104 is configured to render left and right virtual image pixel streams corresponding to the left and right camera image pixel streams. The host computer 104 is configured to send the virtual image pixel streams to the head-mounted display device 106. The left and right virtual image pixel streams include virtual content that may be used to form an AR experience that is presented to the user 102. Typically, the host computer 104 has greater computer processing resources (and power resources) than hardware of the head-mounted display device 106. Such computer processing resources of the host computer 104 may therefore be leveraged to efficiently render virtual streams while freeing up resources of the head-mounted display device 106. In the illustrated example, the host computer 104 is sized and shaped to be portable, such that the host computer 104 can be worn on the user's back. The host computer 104 may take any suitable form.

The left and right cameras 108L, 108R may be calibrated with the head-mounted display device 106, such that the head-mounted display device 106 may have knowledge of calibration parameters of the left and right cameras 108L, 108R. The head-mounted display device 106 may send the calibration parameters to the host computer 104. The host computer 104 may use the calibration parameters to position virtual cameras to render virtual content in the same locations and orientation as the left and right cameras 108L, 108R. In this way, the both the virtual and real-world content may be captured from the same perspective. In some examples, the left and right cameras 108L, 108R may be remapped to another position/orientation during operation and the virtual cameras may be repositioned and reoriented based on updated calibration parameters of the left and right cameras 108L, 108R.

The head-mounted display device 106 is configured to composite the left and right camera image pixel streams with the left and right virtual image pixel streams to generate left and right display image pixel streams. In particular, the respective left and right camera image pixels streams are augmented with virtual content of the respective left and right virtual image pixel streams to form augmented reality imagery. In other words, "real" pass-through content is combined, or composited with virtual content (e.g., generated by a host) to provide the virtual reality experience displayed to the user. In addition to the compositing process, the head-mounted display device 106 may be configured to perform various image signal processing operations on the camera image pixel streams.

As shown in FIG. 1B, the head-mounted display device 106 includes a left display 112L configured to present the left display image pixel stream to a left eye of the user 102, and a right display 112R configured to present the right display image pixel stream to a right eye of the user 102. The left display image pixel stream provides a perspective of the physical scene 110 from the left camera 108L that is augmented with virtual content 114L. The right display image pixel stream provides a perspective of the physical scene 110 from the right camera 108R that is augmented with virtual content 114R. The left and right display pixel streams collectively provide an AR experience, which in the illustrated example includes a virtual dragon (virtual content) flying through a real-world doorway (real content) into a room where the user 102 is located.

The video pass-through computing system 100 is provided as a non-limiting example and other low-latency video pass-through configurations are contemplated herein without departing from the scope of the present disclosure.

Figure 2:
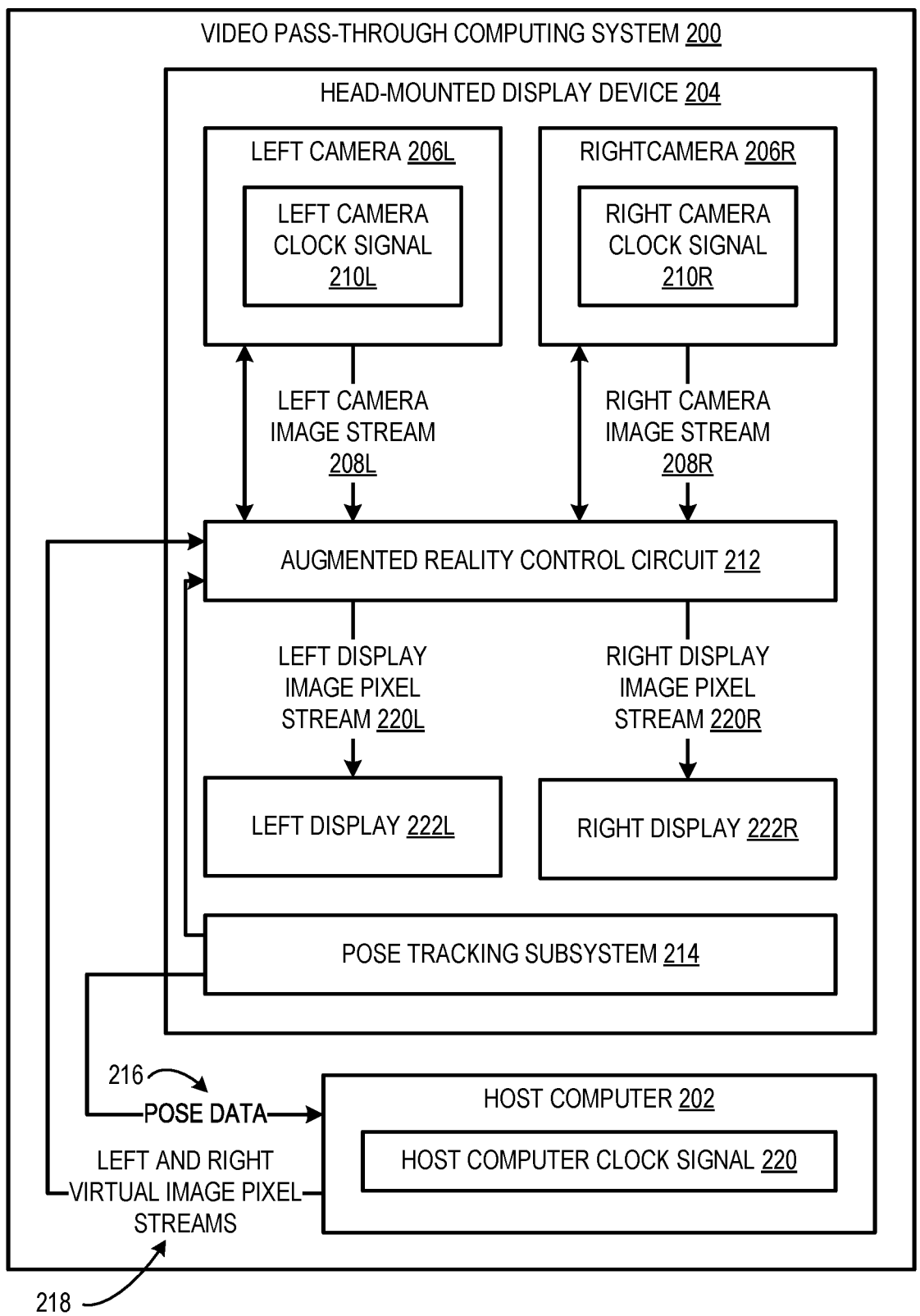
FIG. 2 shows an example video pass-through system computing architecture diagram.

FIG. 2 shows an example video pass-through computing system 200. For example, the video pass-through computing system 200 may embody the video pass-through computing system 100 described above and illustrated in FIGS. 1A and 1B, or any other suitable computing system configured to perform the video pass-through approaches described herein. The video pass-through computing system 200 includes a host computer 202 that is communicatively coupled to a head-mounted display device 204. In some implementations, the host computer 202 may be communicatively coupled with the head-mounted display device 204 via a wired connection. In other implementations, the host computer 202 may be communicatively coupled with the head-mounted display device 204 via a wireless connection. The host computer 202 and the head-mounted display device 204 may communicate via any suitable wired or wireless communication protocol.

The head-mounted display device 204 incudes a left camera 206L and a right camera 206R. The left camera 206L is configured to image a real-world physical scene from a left perspective to generate a left camera image pixel stream 208L. The left camera image pixel stream 208L may be generated according to an exposure timing based on a left camera clock signal 210L. The right camera 206R is configured to image the physical scene from a right perspective, different than the left perspective, to generate a right camera image pixel stream 208R. The right camera image pixel stream 208R may be generated according to an exposure timing based on a right camera clock signal 210R. In some examples, the left camera clock signal 210L and the right camera clock signal 210R may be the same signal that drives both cameras. In other examples, the left camera clock signal 210L and the right camera clock signal 210R may be independent of each other. The exposure timing of each of the respective cameras 206L, 206R indicates a timing at which image capture is initiated to capture an image according to a frame rate of the respective cameras 206L, 206R. The left camera 206L and the right camera 206R may capture images according to any suitable frame rate including, but not limited to 30, 60, 90, or 120 or more frames per second.

The left camera 206L and the right camera 206R may take the form of any suitable type of camera including monochrome, color (e.g., RBG), infrared (IR), depth, ultraviolet (UV), X-ray, or another type of camera, or any other type of sensor (e.g., LIDAR, sonar). In some implementations, the head-mounted display device 204 may include more than two cameras. As one example, the head-mounted display device 204 may include a pair of stereo RGB cameras to provide video pass-through capabilities and a pair of stereo depth cameras to provide depth sensing capabilities. The head-mounted display device 204 may include any suitable number of cameras per eye. In some examples, a camera image pixel stream from a single camera may be presented via one or more displays to both eyes of the user.

The left camera 206L and the right camera 206R are configured to send the left and right camera image pixel streams 208L, 208R to an AR control circuit 212. The pixel streams arriving at circuit 212 may be raw and unprocessed, or they may be processed to varying degrees at the cameras or by intervening components. The left and right cameras 206L, 206R may be communicatively coupled to the AR control circuit 212 using any suitable data transmission technology including, but not limited to HDMI, display port (DP), video graphics array (VGA), universal serial bus (USB).

As indicated, the head-mounted display device 204 may include a pose tracking subsystem 214 to track a pose of the head-mounted display device 204 in the real-world physical scene. In some examples, the pose tracking subsystem 214 may include one or more optical sensors, such as a color or monochrome camera, an infrared camera, and/or a camera sensitive to various other ranges of electromagnetic radiation, such as ultraviolet light, near infrared light, or other suitable frequencies. In some examples, the pose tracking subsystem 214 may include a pair of stereo cameras, which may be the same as or separate from the left and right cameras 206L, 206R. The pose tracking subsystem 214 is configured to determine a pose of the head-mounted display device 204 based on images acquired by the one or more optical sensors. In some examples, the pose tracking subsystem 214 is configured to determine a pose of the head-mounted display device 204 using depth-based techniques, such as time-of-flight or structured light imaging techniques.

In some examples, the pose tracking subsystem 214 may include an inertial measurement unit (IMU), which may include accelerometers, gyroscopes, and/or a compass that can detect, for example, a 6-degree-of-freedom (6DOF) position and orientation of the head-mounted display device 204. In some examples, the pose tracking subsystem 214 may be configured to further refine the 6DOF output of the IMU using visual tracking to search for movement of identified visual features in a series of images captured by the optical sensor(s), so as to generate an estimate of the relative movement of the head-mounted display device 204 based upon the movement of these visual features within successive image frames captured by the optical sensor(s) over time. In one example, the pose tracking subsystem 214 may be configured to determine a pose of the head-mounted display device 204 using simultaneous localization and mapping (SLAM) techniques. In another example, the pose tracking subsystem 214 may be configured to determine a pose of the head-mounted display device 204 using late stage reprojection (LSR) techniques.

The pose tracking subsystem 214 may be configured to track the pose of the head-mounted display device 204 in any suitable manner using any suitable type of sensors. The determined pose of the head-mounted display device 204 may be variously characterized. In some examples, the pose may include a 6DOF position of the head-mounted display device 204 in a world coordinate system. In other examples, the pose may include a relative position of the head-mounted display device 204 in relation to other feature identified in image(s) acquired by the pose tracking subsystem 214. In some implementations, the host computer 202 optionally may perform at least some pose tracking functionality on behalf of the head-mounted display device 204.

The head-mounted display device 204 is configured to send pose data 216 corresponding to the determined pose to the host computer 202. The host computer 202 is configured to render left and right virtual image pixel streams 218 based on the pose of the head-mounted display device 204 (e.g., to composite AR content in appropriate locations). The left and right virtual image pixel streams 218 include virtual content that is used to virtually augment real-world images to form an AR experience that is presented to a user. In some examples, the host computer 202 may render the left and right virtual image pixel streams 218 based on the pose and additional prior pose(s) received from the head-mounted display device 204 that may inform an estimate of a change in pose of the head-mounted display device 204 over time. In some examples, the host computer 202 may render the left and right virtual image pixel streams 218 based on a predicted pose of the head-mounted display device 204 that is derived from the determined pose and/or one or more prior poses of the head-mounted display device 204.

The host computer 202 is configured to render the left and right virtual image pixel streams 218 according to a virtual image frame rate based on a host computer clock signal 220. The host computer 202 may render the virtual image pixel streams according to any suitable frame rate including, but not limited to 30, 60, 90, or 120 or more frames per second. The host computer 104 is configured to send the left and right virtual image pixel streams 218 to the AR control circuit 212 of the head-mounted display device 204. In some examples, the virtual image frame rate may be that same as the camera frame rate. In other examples, the virtual image frame rate may differ from the camera frame rate. As one example, camera images running at 90 Hz may be interleaved 2:1 with virtual image content running at 45 Hz.

The host computer 202 may take any suitable form. In some implementations, the host computer 202 may be a mobile computer that is worn by a user. In other implementations, the host computer 202 may be a remote computer that is wirelessly connected to the head-mounted display device 204. In some examples, the host computer 202 may be implemented as a cloud computing service that streams the left and right virtual image pixel streams to the head-mounted display device 204.

In some examples, the host computer 202 may be employed to compensate for limited power/computer processing capabilities of the head-mounted display device 204.

In some implementations, some, or all of the functionality of the host computer 202 may be performed by the head-mounted display device 204. For example, in some implementations, the head-mounted display device 204 and/or the AR control circuit 212 may be configured to render the virtual image pixel stream.

The AR control circuit 212 is typically implemented as an integrated circuit on-board the head-mounted display device 204, and is configured to generate AR imagery based on (1) the left and right camera image pixel streams 208L, 208R received from the left and right cameras 206L, 206R and (2) the left and right virtual image pixel streams 218 received from the host computer 202. The AR control circuit 212 may include one or more hardware-logic components including, but not limited to, a field-programmable gate array (FPGA), program- and application-specific integrated circuit (PASIC/ASIC), program- and application-specific standard products (PSSP/ASSP), system-on-a-chip (SOC), and complex programmable logic device (CPLD), for example.

Figure 3:
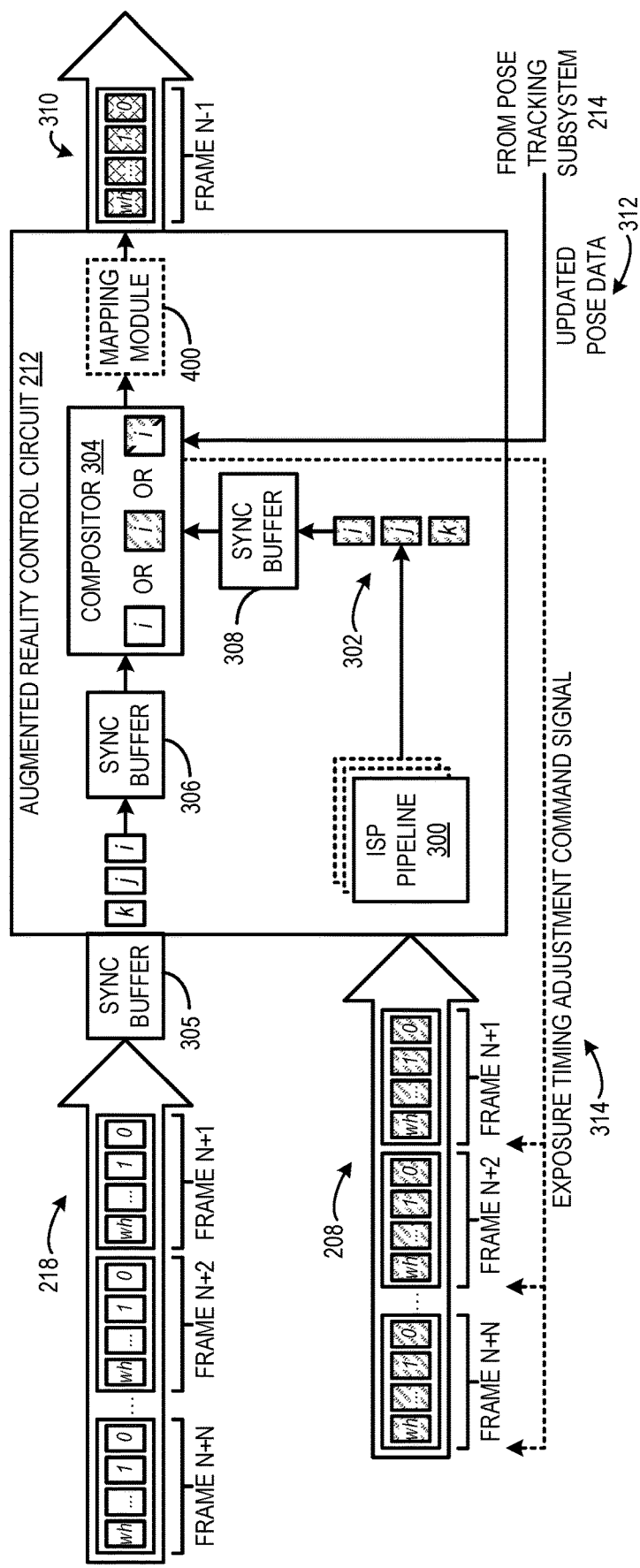
FIG. 3 shows an example augmented reality control circuit of a video pass-through computing system.

FIG. 3 shows different example hardware modules of the AR control circuit 212 shown in FIG. 2. The AR control circuit 212 is configured to receive a camera image pixel stream 208 from a camera 210 of the head-mounted display device 204 shown in FIG. 2. The AR control circuit 212 includes an image signal processing (ISP) hardware pipeline 300 configured to perform sub-frame image signal processing on the camera image pixel stream 208 to generate a processed image pixel stream 302. The ISP hardware pipeline 300 may be configured as a first-in-first-out (FIFO) pipeline. The AR control circuit 212 is configured to buffer sub-frame groupings of pixels of the camera image pixel stream 208 into the ISP hardware pipeline 300 for processing group-by-group at a time. By buffering and processing sub-frame groupings of pixels, the ISP hardware pipeline 300 can initiate image signal processing operations on available pixels without having to wait for an entire image frame to be buffered into the ISP hardware pipeline. Such sub-frame buffering and processing may contribute to lowering the overall latency of the video pass-through computing system 200 shown in FIG. 2.

The number of pixels in the sub-frame grouping buffered into the ISP hardware pipeline 300 may include any suitable sub-frame number of pixels. For example, a sub-frame grouping might include 10-15 scan line rows of pixels. The number of pixels buffered in the sub-frame grouping may vary based on different factors, including, as examples, (1) camera lens type (and corresponding lens distortion), (2) camera/display resolution, (3) display lens characteristics, (4) pixel position in the image frame, and (5) other system characteristics. As one example, an image frame may be processed by the ISP hardware pipeline 300 as a plurality of sub-frame groupings starting with a group in the upper left corner of the frame and ending with a different group in the bottom right of the image frame.

Figure 4:
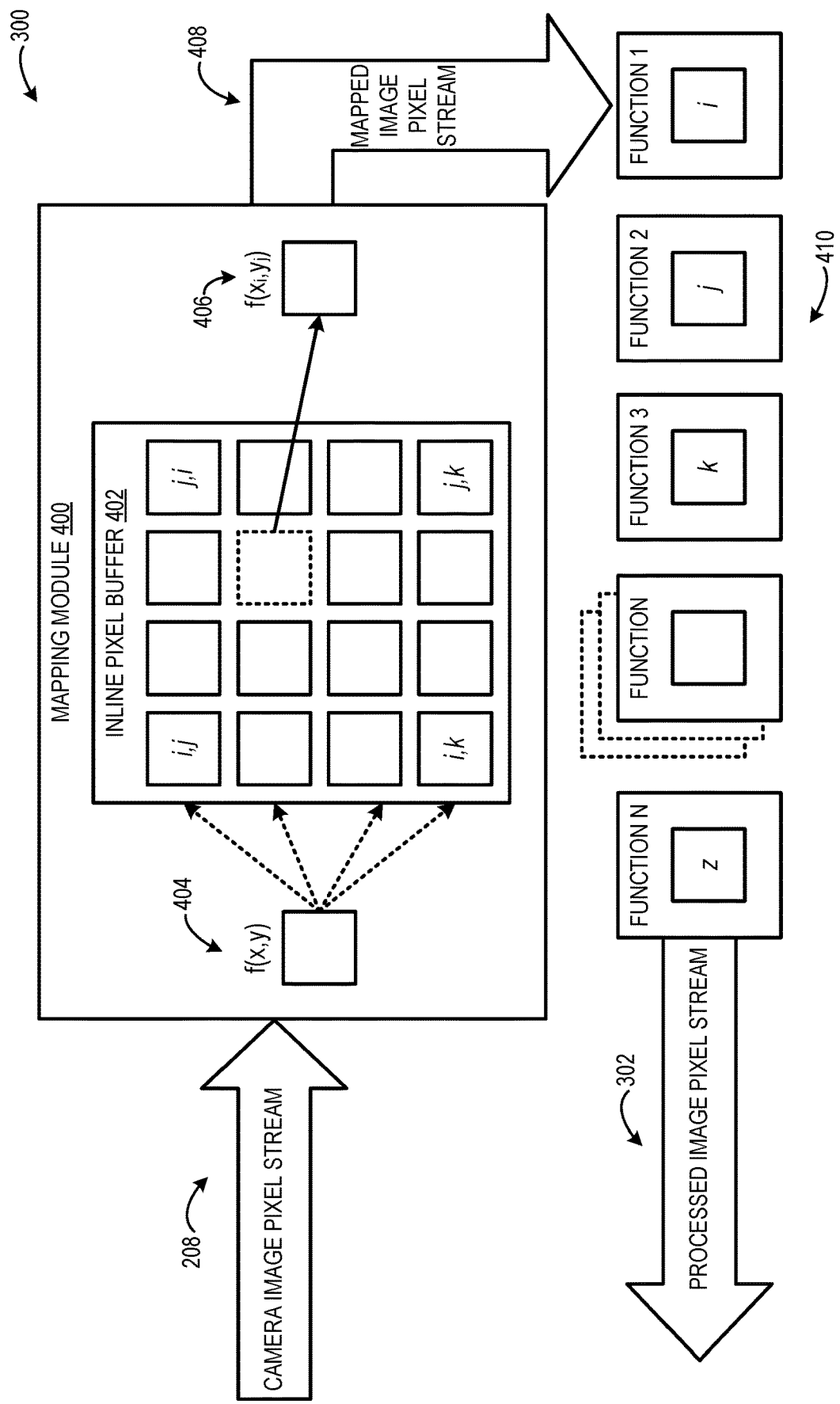
FIG. 4 shows an example image signal processing (ISP) hardware pipeline of augmented reality control circuit.

The ISP hardware pipeline 300 may be configured to perform pixel-wise image signal processing on each pixel in the camera image pixel stream 208. FIG. 4 shows different example hardware modules of ISP hardware pipeline 300 shown in FIG. 3. The ISP hardware pipeline 300 may include a mapping module 400 that is configured to perform a single-step geometric mapping of each pixel from an image sensor camera coordinate space a display coordinate space corresponding to the display (e.g., aspect ratio, resolution, etc.). The mapping module 400 may include an inline pixel buffer 402 that facilitates single-step mapping by encoding all geometric correction operations into a single lookup operation of the inline pixel buffer 402. For example, for a pixel having a given (x,y) coordinate 404 on the camera sensor, the mapping module 400 may perform a lookup of the inline pixel buffer 402 to determine a corresponding coordinate $(x_i, y_j)$ 406 of the pixel on the display. The mapping module 400 is configured to perform pixel-wise mapping of each pixel of the camera pixel stream 208 to generate a mapped image pixel stream 408 where each pixel has display space coordinates.

The mapped image pixel stream 408 is provided to a plurality of image signal processing hardware modules 410 of the ISP hardware pipeline 300. The image signal processing hardware modules 410 are configured to perform different pixel-wise image signal processing functions on the mapped image pixel stream 408, to generate the processed image pixel stream 302 having improved image quality relative to the camera image pixel stream 208. Pixel-wise image signal processing functions performed may include camera and display lens distortion correction. Color calibrations may also be performed, including white balancing, chromatic aberration correction, gamma correction, and black level correction. Any suitable number of processing modules may be employed to perform any number and type of processing functions.

In some implementations, the ISP hardware pipeline 300 may be configured to perform sub-frame image signal processing on a Bayer pattern image pixel stream. In such implementations, buffer sizes in the ISP hardware pipeline may be reduced relative to a configuration where color data of a color image pixel stream is stored in the ISP hardware pipeline. Such reductions in buffer size may contribute to faster image signal processing and overall lower latency of the video pass-through computing system.

In implementations where mapping from camera space coordinates to display space coordinates is performed by the ISP pipeline prior to compositing as illustrated in FIG. 4, the mapping module 400 may be configured to receive a distinct alpha channel parameter value for each color component of the virtual image pixel stream. The mapping module 400 may be configured to bake this color information into the mapped image pixel stream 408 such that the color information may be available to be used for proper compositing of the virtual content with the real-world content.

Returning to FIG. 3, since the camera image pixel stream 208 is processed by the ISP hardware pipeline 300, and the virtual image pixel stream is not, the camera image pixel stream 208 may be pre-exposed to circuit 212 ahead of the virtual image pixel stream 218 in order to temporally synchronize arrival of the two image pixel streams at a compositor 304 of the AR control circuit 212. In particular, pixels of the camera image pixel stream 208 are provided to the ISP hardware pipeline 300 prior to corresponding pixels of the virtual image pixel stream 218 being received by the AR control circuit 212. In the illustrated example, sub-groupings of pixels of frame (N+1) of the camera image pixel stream 208 are buffered into the ISP hardware pipeline 300 prior to pixels of frame (N+1) of the virtual image pixel stream 218 being received by the AR control circuit 212. In particular, the pixels of the virtual image pixel stream 218 are buffered into an input synchronization buffer 305 that is configured to hold the pixels of the virtual image pixel stream 218 while the pixels of the camera image pixel stream 208 are processed by the ISP hardware pipeline 300.

The AR control circuit 212 may include a virtual image pixel synchronization buffer 306 and a processed image pixel synchronization buffer 308 to facilitate temporal synchronization of pixels arriving at the compositor 304. In the illustrated example, note that the pixels of frame (N) of the virtual image pixel stream 218 are output from the input synchronization buffer 305 and sent to the virtual image pixel synchronization buffer 306 as the pixels of frame (N) of the processed image pixel stream are output from the ISP hardware pipeline 300 and sent to the processed image pixel synchronization buffer 308. The processed image pixel synchronization buffer 308 may be configured to output pixels of the virtual image pixel stream 218 to the compositor 304 according to a designated timing, which may be adjusted based on feedback from the compositor 304 (or another monitoring component of the AR control circuit 212). The synchronization buffers 306, 308 may be configured to be self-tuning by varying a number of pixels that are stored in the respective buffers based on the received feedback. The timing of the synchronization buffers 306, 308 typically may adjust over the course of an image frame based on the feedback as discussed in further detail below.

The compositor 304 is configured to composite the processed image pixel stream 302 with the virtual image pixel stream 218 to generate a composited display image pixel stream 310—i.e., containing both "real" pass-through content and virtual content from the host computer. In particular, the compositor 304 is configured to composite the processed image pixel stream 302 with the virtual image pixel stream 218 by, on a pixel-by-pixel basis, selecting a pixel from the processed image pixel stream 302, selecting a pixel from the virtual image pixel stream 218, and/or blending two corresponding pixels together from the processed image pixel stream 302 and the virtual image pixel stream 218. In some examples, pixel selecting/blending may include determining layering (e.g., foreground/background positions) of the virtual content relative to real-world content. In some examples, pixel blending may include determining a translucency of the virtual content relative to real-world content, such as by combining alpha channel values of the two pixels. In other words, depending on the position of the pixel on the display, the display pixel may include virtual content, real-world content of the physical scene, or a combination of both virtual content and real-world content.

Since the virtual image pixel stream 218 is rendered by the host computer 202 and then sent to the head-mounted display device 204, latency between when the virtual image pixel stream 218 is rendered and when the virtual image pixel stream 218 arrives at the compositor 304 may result in some degree of pose error. In some implementations, as part of the compositing process, the compositor 304 may be configured to perform late-stage reprojection operations to modify the virtual image pixel stream locally on the AR control circuit 212 to more closely align with the actual pose of the head-mounted display device 204. In particular, the compositor 304 may be configured to receive updated pose data 312 indicating an updated pose of the head-mounted display device 204 from the pose tracking subsystem 214 (shown in FIG. 2) after the virtual image pixel stream 218 is rendered by the host computer 202. The compositor 304 may be further configured to reproject the virtual image pixel stream based on the updated pose data 312 to generate a reprojected virtual image pixel stream and composite the reprojected virtual image pixel stream with the processed image pixel stream 302.

In other implementations, a different hardware module of the AR control circuit 212 may perform late-stage reprojection of the virtual image pixel stream 218 prior to the virtual image pixel stream 218 being provided to the compositor 304.

The AR control circuit 212 may be configured to match the different time domains of the processed image pixel stream 302, which is derived from the camera clock signal, and the virtual image pixel stream 218, which is derived from the host computer clock signal, based on determining whether a corresponding pixel of the processed image pixel stream 302 is received at the hardware compositor 304 in temporal synchronization with the corresponding pixel of the virtual image pixel stream 218. In particular, if a pixel of the camera image pixel stream is not in temporal synchronization with a pixel of the virtual image pixel stream, the AR control circuit 212 sends a command signal to the camera to adjust the exposure timing of the camera, which is the timing when the camera initiates image capture of an image frame (i.e., a timestamp indicating when the exposure is initiated). In some examples, the AR control circuit 212 may be configured to determine an arrival time when a corresponding pixel of the processed image pixel stream 302 is received at the hardware compositor 304 in relation to the corresponding pixel of the virtual image pixel stream 218 and adjust the exposure timing based on or using the arrival time. In some examples, the arrival time may be determined based on the pixel depths of the synchronization buffers. As one example, the virtual image pixel synchronization buffer 306 may have a current pixel depth of y=400, and the processed image pixel synchronization buffer 308 may have a current pixel depth of y=100. The pixels depths of these synchronization buffers indicate that the processed image pixel stream 302 is being provided to the compositor 304 with an arrival time ahead of the virtual image pixel stream 218. In other words, the processed image pixel stream 302 and the virtual image pixel stream 218 are not temporally synchronized. Accordingly, the exposure timing may be adjusted such that both buffers have the same pixel depth. In particular, the exposure starting time may be delayed by 1 unit. The next time through the feedback loop, the processed image pixel synchronization buffer 308 should have a current pixel depth of y>100. The exposure timing may be repeatedly adjusted based on the feedback until the pixel depths (i.e., the two y's) match up. In this example, the exposure timing is delayed responsive to the arrival time for the corresponding pixel being early in relation to arrival of the pixel of the virtual image pixel stream 218 at the hardware compositor 304. Conversely, the exposure timing may be advanced responsive to the arrival time for the corresponding pixel being late in relation to arrival of the pixel of the virtual image pixel stream 218 at the hardware compositor 304. For example, the exposure timing may be adjusted one row of the image frame at a time, or in any other appropriate increment/interval, until temporal synchronization is achieved. Such adjustment of the exposure timing may typically allow for temporal synchronization to be achieved in 1-2 image frames. In some examples, the determination of temporal synchronization may be performed on a pixel-by-pixel basis, such that said determination may be made for each pixel of the virtual image pixel stream. In other examples, said determination may be made for every other pixel, or every $3^{rd}$, $5^{th}$ or $10^{th}$ pixel in the virtual image pixel stream. In still other examples, said determination may be made once per row of an image frame or once per image frame. Said determination of temporal synchronization may be made according to any suitable period or interval.

In this implementation, the exposure timing of the camera is adjusted relative to the clock signal of the host computer 202. In other implementations, the clock signal of the host computer that dictates the rendering frame rate of the virtual image pixel stream may be adjusted relative to the clock signal of the camera.

Although the temporal synchronization of the virtual image pixel stream and the processed image pixel stream is discussed in terms of arrival at the hardware compositor 304, the determination of temporal synchronization may be conducted at any suitable juncture within the AR control circuit 212. Generally, temporal synchronization between a pixel of the camera image pixel stream and a corresponding pixel the virtual image pixel stream may be defined as the two pixels arriving at a logical juncture within the AR control circuit 212 at substantially the same time such that the two pixels can be properly composited to form a display image pixel that is properly aligned in display space and free from artifacts. In some examples, such temporal synchronization may account for an insignificant difference in arrival time of the pixels (e.g., below a tolerance threshold in arrival time of the two pixels) that still allows for the pixels to be properly composited into the display image pixel stream.

In some implementations, the mapping module 400 optionally may be positioned downstream of the hardware compositor 304. In such implementations, the virtual image pixel stream 218 may be composited with a camera image pixel stream that is processed by the ISP pipeline 300 to perform various image quality improvements but remains in camera pixel space coordinates. In other words, pixels of a composited image pixel stream output from the compositor 304 have camera space coordinates. This composited image pixel stream may be input to the mapping module 400 to map the pixels from camera space coordinates to display space coordinates. For example, such mapping may be performed using the single-step mapping techniques discussed above. It will be appreciated that mapping of pixels from camera space coordinates to display space coordinates may be performed at any suitable processing position in the AR control circuit 212.

For purposes of clarity, only one virtual image pixel stream, one camera image pixel stream, and one display image pixel stream are shown in FIG. 3. In practice, the AR control circuit 212 is configured to generate separate left and right display image pixel streams from left and right camera image pixel streams composited with left and right virtual image pixel streams, respectively. In some implementations, the AR control circuit 212 may be configured to composite multiple different camera image pixel streams to generate a display image pixel stream. For example, the AR control circuit 212 may be configured to composite an infrared camera image pixel stream with an RGB camera image pixel stream. The AR control circuit 212 may be configured to composite any suitable number of different image pixels streams from any suitable number of different sources to generate AR imagery. In some instances, the AR control circuit 212 may pass through only the camera/processed image pixel stream to the display to provide a non-augmented view of the physical scene. In some instances, the AR control circuit 212 may pass through only the virtual image pixel stream to the display to provide a virtual reality experience.

Returning to FIG. 2, the AR control circuit 212 is configured to output a left display image pixel stream 220L to a left display 222L and a right display image pixel stream 220R to a right display 222R. The left and right display image pixel streams 220L, 220R correspond to the display image pixel stream 310 shown in FIG. 3. The left display 222L is configured to display the left display image pixel stream 220L and the right display 222R is configured to display the right display image pixel stream 220R to collective present an AR experience to the user. The left and right displays 222L, 222R may employ any suitable display technology. For example, the left and right displays 222L, 222R may be opaque displays and the head-mounted display device may be configured to block out a majority of ambient light, such that a brightness and contrast of virtual imagery may be more perceptible by a user viewing the opaque head-mounted display relative to viewing a see-through display. The left and right displays 222L, 222R may correspond to the left and right displays 112L, 112R shown in FIG. 1B.

Figure 5:
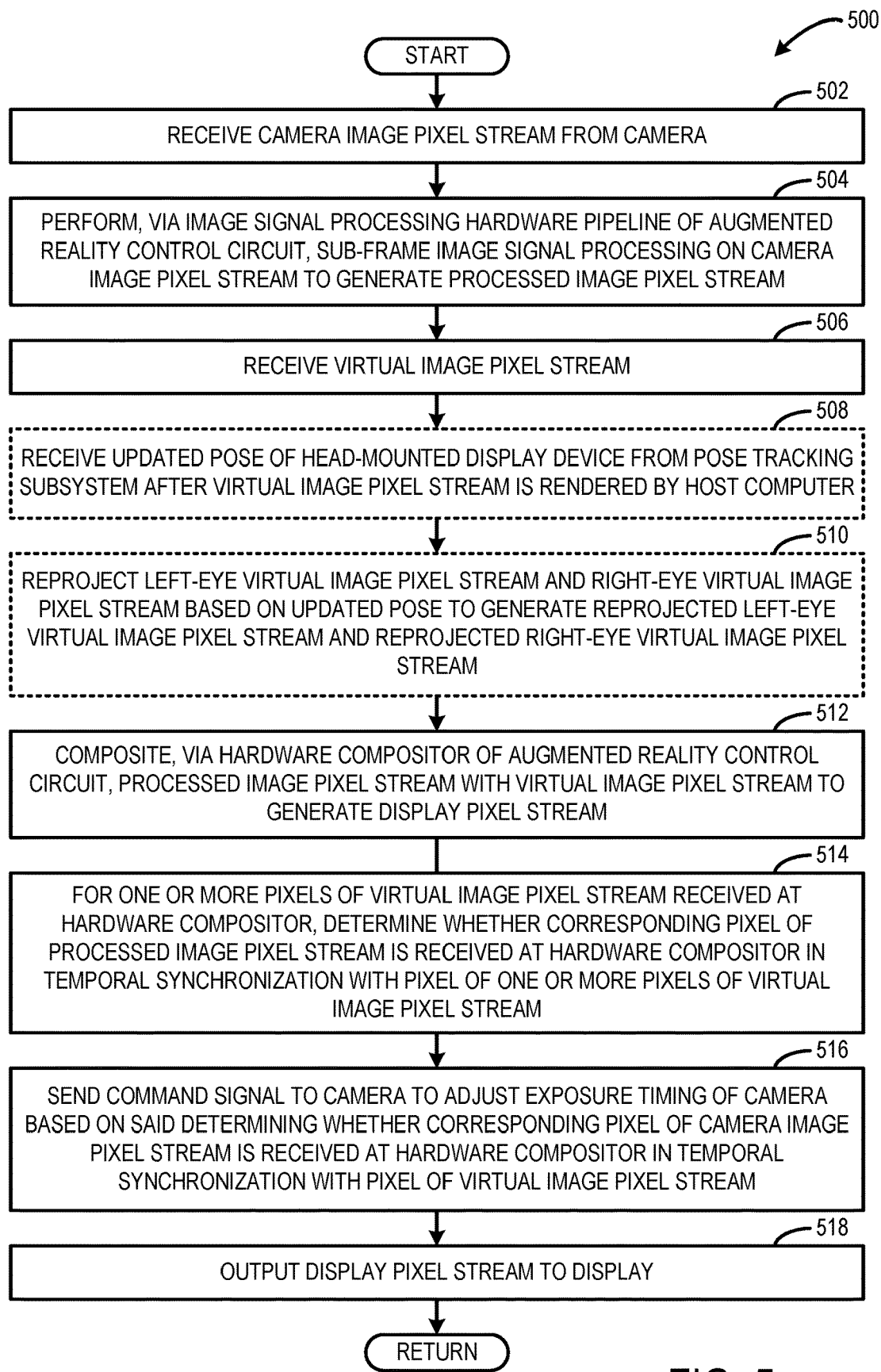
FIG. 5 shows an example video pass-through method.

FIG. 5 shows an example video pass-through method 500. The method may be performed by the AR control circuit 212 of the head-mounted display device 204 shown in FIG. 2, or generally by any other suitable video pass-through computing system. At 502, the method 500 includes receiving a camera image pixel stream from a camera of the head-mounted display device. At 504, the method 500 includes performing, via an image signal processing hardware pipeline of the AR control circuit, sub-frame image signal processing on the camera image pixel stream to generate a processed image pixel stream.

In some implementations, performing sub-frame image signal processing on the camera image pixel stream optionally may include pixel-wise image signal processing on each pixel of the camera image pixel stream. In some implementations, performing pixel-wise image signal processing optionally may include performing a single-step geometric mapping of each pixel from a camera coordinate space to a display coordinate space. In such implementations, the ISP pipeline may receive a distinct alpha channel parameter value for each color component of the virtual image pixel stream that may be baked into a mapped/processed image pixel stream such that the color information may be available to be used for proper compositing of the virtual content with the real-world content. In some examples, performing pixel-wise image signal processing optionally may include performing one or more of a camera lens distortion correction, a display lens distortion correction, and color calibration.

At 506, the method 500 includes receiving a virtual image pixel stream. In some implementations, the virtual image pixel stream may be received from a host computer that is connected to the AR control circuit. The host computer may be configured to render the virtual image pixel stream. In such examples, the pixels of the camera image pixel stream may be provided to the image signal processing hardware pipeline prior to corresponding pixels of the virtual image pixel stream being received by the AR control circuit from the host computer, such that image signal processing may be completed in time for the two image pixel streams to be temporally synchronized. In other implementations, the virtual image pixel steam may be rendered on-board the head-mounted display device. In some examples, receiving the virtual image pixel stream means that the AR control circuit (or some other on-board processing component) renders the virtual image pixel stream such that the virtual image pixel stream is available to be composited with the camera image pixel stream.

In some implementations, at 508, the method 500 optionally may include receiving an updated pose of the head-mounted display device from a pose tracking subsystem after the virtual image pixel stream is rendered by the host computer. At 510, the method 500 optionally may include reprojecting the virtual image pixel stream based on the updated pose to generate a reprojected virtual image pixel stream.

At 512, the method 500 includes compositing, via a hardware compositor of the AR control circuit, the processed image pixel stream with the virtual image pixel stream to generate a display image pixel stream. In implementations where late-stage reprojection is performed by the AR control circuit, the reprojected virtual image pixel stream may be composited with the camera image pixel stream to generate the display image pixel stream. In some implementations, virtual image pixels may be composited with processed camera image pixels that are mapped to display space coordinates and include alpha channel color information. In other implementations, virtual image pixels may be composited with processed camera image pixels that have camera space coordinates, and the resulting composited image pixel stream is mapped to display space coordinates downstream of the hardware compositor.

At 514, the method 500 includes for one or more pixels of the virtual image pixel stream received at the hardware compositor, determining whether a corresponding pixel of the processed image pixel stream is received at the hardware compositor in temporal synchronization with a pixel of the one or more pixels of the virtual image pixel stream. At 516, the method 500 includes sending a command signal to the camera to adjust the exposure timing of the camera based on said determining whether the corresponding pixel of the camera image pixel stream is received at the hardware compositor in temporal synchronization with the pixel of the virtual image pixel stream. At 518, the method 500 includes output the display pixel stream to a display of the head-mounted display device.

The method 500 may be performed repeatedly for each corresponding camera/display of the video pass-through computing system. Thus, in one example, the method 500 may be performed for a left camera corresponding to a left display, and the method 500 may be repeated for a right camera corresponding to a right display.

The above described method may be performed to provide low-latency video pass-through imagery to a display while maintaining temporal synchronization between camera and virtual image pixel streams.

Although the above described video pass-through computing systems and methods are discussed in the context of left and right cameras "passing through" imagery to corresponding left and right displays, these concepts are broadly applicable to any suitable type of video pass-through computing system. As one example, such concepts are also applicable to a single camera passing through a camera image pixel stream that is augmented with virtual content for presentation by a single display. As another example, such concepts are also applicable to left and right cameras passing through camera image pixel streams that are augmented with virtual content for presentation by a single display. It will be appreciated that a video pass-through computing system may include any suitable number of cameras and any suitable number of displays without departing from the scope of the present disclosure.

Figure 6:
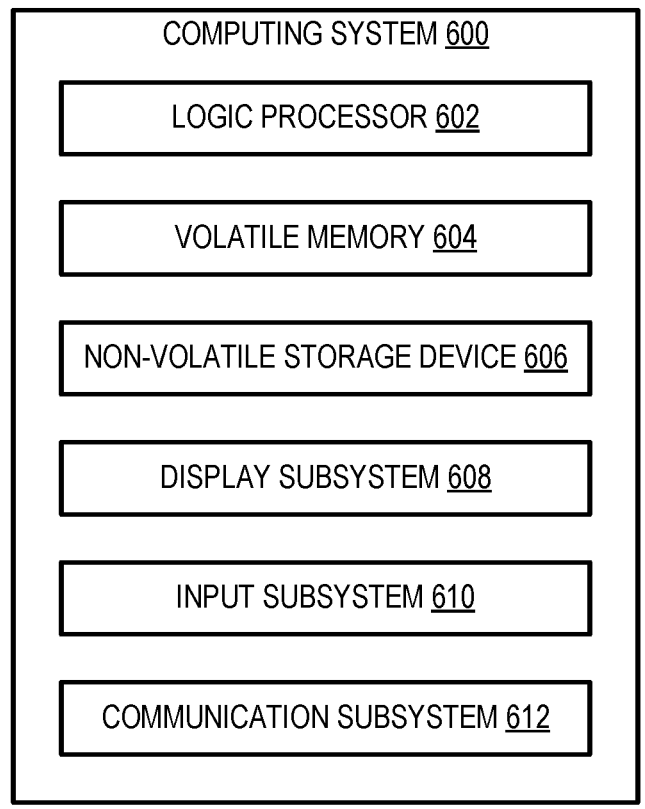
FIG. 6 shows an example computing system.

FIG. 6 schematically shows a non-limiting implementation of a computing system 600 that can enact one or more of the methods and processes described above. Computing system 600 is shown in simplified form. Computing system 600 may embody the host computer 104 and the head-mounted display device 106 described above and illustrated in FIG. 1 as well as the computing system 200, the host computer 202, and the head-mounted display device 204 described above and illustrated in FIG. 2. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 600 typically implemented by a processor to perform a particular function using portions of volatile memory, which function involves transformative processing that specially configures the processor to perform the function. Thus, a module may be instantiated via logic processor 602 executing instructions held by non-volatile storage device 606, using portions of volatile memory 604. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 600 to send and/or receive messages to and/or from other devices via a network such as the Internet.

In an example, a video pass-through computing system, comprises a host computer configured to render a virtual image pixel stream, a head-mounted display device including a camera configured to image a physical scene according to an exposure timing, an augmented reality control circuit configured to receive a camera image pixel stream from the camera, receive the virtual image pixel stream from the host computer, composite, via a hardware compositor of the augmented reality control circuit, the camera image pixel stream with the virtual image pixel stream to generate a display image pixel stream, for one or more pixels of the virtual image pixel stream received at the hardware compositor, if the camera image pixel stream is not in temporal synchronization with a pixel of the one or more pixels of the virtual image pixel stream, send a command signal to the camera to adjust the exposure timing of the camera, and a display configured to present the display image pixel stream. In this example and/or other examples, the augmented reality control circuit may be configured to perform, via an image signal processing hardware pipeline of the augmented reality control circuit, sub-frame image signal processing on the camera image pixel stream to generate a processed image pixel stream, pixels of the camera image pixel stream may be provided to the image signal processing hardware pipeline prior to corresponding pixels of the virtual image pixel stream being received by the augmented reality control circuit, and the hardware compositor of the augmented reality control circuit may be configured to composite the processed image pixel stream with the virtual image pixel stream to generate the display image pixel stream. In this example and/or other examples, the image signal processing hardware pipeline may be configured to buffer a sub-frame grouping of pixels of the camera image pixel stream and perform pixel-wise image signal processing on each pixel in the sub-frame grouping. In this example and/or other examples, the pixel-wise image signal processing performed via the image signal processing hardware pipeline may include performing one or more of a camera lens distortion correction, a display lens distortion correction, and color calibration on each pixel in the sub-frame grouping. In this example and/or other examples, the augmented reality control circuit may be configured to perform a single-step geometric mapping of each pixel in the camera image pixel stream from a camera coordinate space to a display coordinate space. In this example and/or other examples, the head-mounted display device may further include a pose tracking subsystem configured to (1) track a pose of the head-mounted display device, and (2) send the pose to the host computer, and the host computer may be configured to render the virtual image pixel stream using the pose of the head-mounted display device. In this example and/or other examples, the augmented reality control circuit may be configured to (1) receive an updated pose of the head-mounted display device from the pose tracking subsystem after the virtual image pixel stream is rendered by the host computer, and (2) reproject the virtual image pixel stream using the updated pose to generate a reprojected virtual image pixel stream, and the reprojected virtual image pixel stream may be composited with the camera image pixel stream. In this example and/or other examples, the augmented reality control circuit may be configured to determine an arrival time when a corresponding pixel of the camera image pixel stream is received at the hardware compositor in relation to a pixel of the one or more pixels of the virtual image pixel stream, and the exposure timing may be adjusted using the arrival time. In this example and/or other examples, the exposure timing may be advanced responsive to the arrival time for the corresponding pixel being late in relation to arrival of the pixel of the virtual image pixel stream at the hardware compositor. In this example and/or other examples, the exposure timing may be delayed responsive to the arrival time for the corresponding pixel being early in relation to arrival of the pixel of the virtual image pixel stream at the hardware compositor. In this example and/or other examples, the hardware compositor may be configured to composite the camera image pixel stream with the virtual image pixel stream by, on a pixel-by-pixel basis, selecting a pixel from the camera image pixel stream, selecting a pixel from the virtual image pixel stream, or blending two corresponding pixels together from the camera image pixel stream and the virtual image pixel stream. In this example and/or other examples, the camera may be a left camera, the camera image pixel stream may be a left camera image pixel stream, the display may be a left display, the display image pixel stream may be a left display image pixel stream, and the virtual image pixel stream may be a left virtual image pixel stream, the head-mounted display device may further include (1) a right camera configured to image the physical scene according to an exposure timing to generate a right camera image pixel stream, and (2) a right display, the host computer may be configured to render a right virtual image pixel stream, the augmented reality control circuit is further configured to receive the right camera image pixel stream from the right camera, receive the right virtual image pixel stream from the host computer, composite, via the hardware compositor of the augmented reality control circuit, the right camera image pixel stream with the right virtual image pixel stream to generate a right display image pixel stream, and for one or more pixels of the right virtual image pixel stream received at the hardware compositor, if a corresponding pixel of the right camera image pixel stream is not in temporal synchronization with a pixel of the one or more pixels of the right virtual image pixel stream, send a command signal to the right camera to adjust the exposure timing of the right camera; and the right display may be configured to present the right display image pixel stream.

In an example, an video pass-through method performed by an augmented reality control circuit of a head-mounted display device, the method comprises receiving a camera image pixel stream of a physical scene from a camera, the camera image pixel stream is generated according to an exposure timing, receiving a virtual image pixel stream, compositing, via a hardware compositor of the augmented reality control circuit, the camera image pixel stream with the virtual image pixel stream to generate a display image pixel stream, for one or more pixels of the virtual image pixel stream received at the hardware compositor, if a corresponding pixel of the camera image pixel stream is not in temporal synchronization with a pixel of the one or more pixels of the virtual image pixel stream, sending a command signal to the camera to adjust the exposure timing of the camera, and outputting the display image pixel stream to the display. In this example and/or other examples, the method may further comprise performing, via an image signal processing hardware pipeline of the augmented reality control circuit, sub-frame image signal processing on the camera image pixel stream to generate a processed image pixel stream, pixels of the camera image pixel stream may be provided to the image signal processing hardware pipeline prior to corresponding pixels of the virtual image pixel stream being received by the augmented reality control circuit, and the hardware compositor of the augmented reality control circuit may be configured to composite the processed image pixel stream with the virtual image pixel stream to generate the display image pixel stream. In this example and/or other examples, the image signal processing hardware pipeline may be configured to buffer a sub-frame grouping of pixels of the camera image pixel stream and perform pixel-wise image signal processing on each pixel in the sub-frame grouping. In this example and/or other examples, performing the pixel-wise image signal processing via the image signal processing hardware pipeline may include performing a single-step geometric mapping of each pixel from a camera coordinate space to a display coordinate space and performing one or more of a camera lens distortion correction, a display lens distortion correction, and color calibration. In this example and/or other examples, the head-mounted display device may further include a pose tracking subsystem configured to track a pose of the head-mounted display device, a host computer may be configured to render the virtual image pixel stream using the pose of the head-mounted display device and send the virtual image pixel stream to the augmented reality control circuit of the head-mounted display device, and the method may further comprise 1) receiving an updated pose of the head-mounted display device from the pose tracking subsystem after the virtual image pixel stream is rendered by the host computer, and 2) reprojecting the virtual image pixel stream using the updated pose to generate a reprojected virtual image pixel stream, and the reprojected virtual image pixel stream may be composited with the camera image pixel stream to generate the display image pixel stream. In this example and/or other examples, the method may further comprise determining an arrival time when a corresponding pixel of the camera image pixel stream is received at the hardware compositor in relation to the pixel of the virtual image pixel stream, and the exposure timing may be adjusted using the arrival time. In this example and/or other examples, compositing, via a hardware compositor of the augmented reality control circuit, the camera image pixel stream with the virtual image pixel stream may include, on a pixel-by-pixel basis, selecting a pixel from the camera image pixel stream, selecting a pixel from the virtual image pixel stream, or blending two corresponding pixels together from the camera image pixel stream and the virtual image pixel stream.

In an example, a video pass-through computing system, comprises a host computer configured to render a virtual image pixel stream, and a head-mounted display device including a camera configured to image a physical scene according to an exposure timing, an augmented reality control circuit configured to receive a camera image pixel stream from the camera, perform, via an image signal processing hardware pipeline of the augmented reality control circuit, sub-frame image signal processing on the camera image pixel stream to generate a processed image pixel stream, receive the virtual image pixel stream from the host computer, pixels of the camera image pixel stream are provided to the image signal processing hardware pipeline prior to corresponding pixels of the virtual image pixel stream being received by the augmented reality control circuit, composite, via a hardware compositor of the augmented reality control circuit, the processed image pixel stream with the virtual image pixel stream to generate a display image pixel stream, for each pixel of the virtual image pixel stream received at the hardware compositor, if a corresponding pixel of the processed image pixel stream is received not in temporal synchronization with the pixel of the virtual image pixel stream, send a command signal to the camera to adjust the exposure timing, and a display configured to present the display image pixel stream.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A video pass-through computing system, comprising:
a host computer configured to render a virtual image pixel stream; and
a head-mounted display device including:
a camera configured to image a physical scene according to an exposure timing, the exposure timing defining when the camera initiates image capture of an image frame;
an augmented reality control circuit configured to:
receive a camera image pixel stream from the camera;
receive the virtual image pixel stream from the host computer;
composite, via a hardware compositor of the augmented reality control circuit, the camera image pixel stream with the virtual image pixel stream to generate a display image pixel stream; and
for one or more pixels of the virtual image pixel stream received at the hardware compositor, if the camera image pixel stream is not in temporal synchronization with a pixel of the one or more pixels of the virtual image pixel stream, send a command signal to the camera to adjust the exposure timing of the camera; and
a display configured to present the display image pixel stream.

2. The video pass-through computing system of claim 1, wherein the augmented reality control circuit is configured to perform, via an image signal processing hardware pipeline of the augmented reality control circuit, sub-frame image signal processing on the camera image pixel stream to generate a processed image pixel stream, wherein pixels of the camera image pixel stream are provided to the image signal processing hardware pipeline prior to corresponding pixels of the virtual image pixel stream being received by the augmented reality control circuit, and wherein the hardware compositor of the augmented reality control circuit is configured to composite the processed image pixel stream with the virtual image pixel stream to generate the display image pixel stream.

3. The video pass-through computing system of claim 2, wherein the image signal processing hardware pipeline is configured to buffer a sub-frame grouping of pixels of the camera image pixel stream and perform pixel-wise image signal processing on each pixel in the sub-frame grouping.

4. The video pass-through computing system of claim 3, wherein the pixel-wise image signal processing performed via the image signal processing hardware pipeline includes performing one or more of a camera lens distortion correction, a display lens distortion correction, and color calibration on each pixel in the sub-frame grouping.

5. The video pass-through computing system of claim 1, wherein the augmented reality control circuit is configured to perform a single-step geometric mapping of each pixel in the camera image pixel stream from a camera coordinate space to a display coordinate space.

6. The video pass-through computing system of claim 1, wherein the head-mounted display device further includes a pose tracking subsystem configured to (1) track a pose of the head-mounted display device, and (2) send the pose to the host computer, and wherein the host computer is configured to render the virtual image pixel stream using the pose of the head-mounted display device.

7. The video pass-through computing system of claim 6, wherein the augmented reality control circuit is configured to (1) receive an updated pose of the head-mounted display device from the pose tracking subsystem after the virtual image pixel stream is rendered by the host computer, and (2) reproject the virtual image pixel stream using the updated pose to generate a reprojected virtual image pixel stream, and wherein the reprojected virtual image pixel stream is composited with the camera image pixel stream.

8. The video pass-through computing system of claim 1, wherein the augmented reality control circuit is configured to determine an arrival time when a corresponding pixel of the camera image pixel stream is received at the hardware compositor in relation to a pixel of the one or more pixels of the virtual image pixel stream, and wherein the exposure timing is adjusted using the arrival time.

9. The video pass-through computing system of claim 8, wherein the exposure timing is advanced responsive to the arrival time for the corresponding pixel being late in relation to arrival of the pixel of the virtual image pixel stream at the hardware compositor.

10. The video pass-through computing system of claim 8, wherein the exposure timing is delayed responsive to the arrival time for the corresponding pixel being early in relation to arrival of the pixel of the virtual image pixel stream at the hardware compositor.

11. The video pass-through computing system of claim 1, wherein the hardware compositor is configured to composite the camera image pixel stream with the virtual image pixel stream by, on a pixel-by-pixel basis, selecting a pixel from the camera image pixel stream, selecting a pixel from the virtual image pixel stream, or blending two corresponding pixels together from the camera image pixel stream and the virtual image pixel stream.

12. The video pass-through computing system of claim 1,
wherein the camera is a left camera, the camera image pixel stream is a left camera image pixel stream, the display is a left display, the display image pixel stream is a left display image pixel stream, and the virtual image pixel stream is a left virtual image pixel stream;
wherein the head-mounted display device further includes (1) a right camera configured to image the physical scene according to an exposure timing to generate a right camera image pixel stream, and (2) a right display, wherein the host computer is configured to render a right virtual image pixel stream;
wherein the augmented reality control circuit is further configured to:
receive the right camera image pixel stream from the right camera;
receive the right virtual image pixel stream from the host computer;
composite, via the hardware compositor of the augmented reality control circuit, the right camera image pixel stream with the right virtual image pixel stream to generate a right display image pixel stream; and
for one or more pixels of the right virtual image pixel stream received at the hardware compositor, if a corresponding pixel of the right camera image pixel stream is not in temporal synchronization with a pixel of the one or more pixels of the right virtual image pixel stream, send a command signal to the right camera to adjust the exposure timing of the right camera; and wherein the right display is configured to present the right display image pixel stream.

13. A video pass-through method performed by an augmented reality control circuit of a head-mounted display device, the method comprising:
receiving a camera image pixel stream of a physical scene from a camera, wherein the camera image pixel stream is generated according to an exposure timing, the exposure timing defining when the camera initiates image capture of an image frame;
receiving a virtual image pixel stream;
compositing, via a hardware compositor of the augmented reality control circuit, the camera image pixel stream with the virtual image pixel stream to generate a display image pixel stream;
for one or more pixels of the virtual image pixel stream received at the hardware compositor, if a corresponding pixel of the camera image pixel stream is not in temporal synchronization with a pixel of the one or more pixels of the virtual image pixel stream, sending a command signal to the camera to adjust the exposure timing of the camera; and
outputting the display image pixel stream to the display.

14. The video pass-through method of claim 13, further comprising performing, via an image signal processing hardware pipeline of the augmented reality control circuit, sub-frame image signal processing on the camera image pixel stream to generate a processed image pixel stream, wherein pixels of the camera image pixel stream are provided to the image signal processing hardware pipeline prior to corresponding pixels of the virtual image pixel stream being received by the augmented reality control circuit, and wherein the hardware compositor of the augmented reality control circuit is configured to composite the processed image pixel stream with the virtual image pixel stream to generate the display image pixel stream.

15. The video pass-through method of claim 14, wherein the image signal processing hardware pipeline is configured to buffer a sub-frame grouping of pixels of the camera image pixel stream and perform pixel-wise image signal processing on each pixel in the sub-frame grouping.

16. The video pass-through method of claim 15, wherein performing the pixel-wise image signal processing via the image signal processing hardware pipeline includes performing a single-step geometric mapping of each pixel from a camera coordinate space to a display coordinate space and performing one or more of a camera lens distortion correction, a display lens distortion correction, and color calibration.

17. The video pass-through method of claim 13, wherein the head-mounted display device further includes a pose tracking subsystem configured to track a pose of the head-mounted display device, wherein a host computer is configured to render the virtual image pixel stream using the pose of the head-mounted display device and send the virtual image pixel stream to the augmented reality control circuit of the head-mounted display device, and wherein the method further comprises 1) receiving an updated pose of the head-mounted display device from the pose tracking subsystem after the virtual image pixel stream is rendered by the host computer, and 2) reprojecting the virtual image pixel stream using the updated pose to generate a reprojected virtual image pixel stream, and wherein the reprojected virtual image pixel stream is composited with the camera image pixel stream to generate the display image pixel stream.

18. The video pass-through method of claim 13, further comprising determining an arrival time when a corresponding pixel of the camera image pixel stream is received at the hardware compositor in relation to the pixel of the virtual image pixel stream, and wherein the exposure timing is adjusted using the arrival time.

19. The video pass-through method of claim 13, wherein compositing, via a hardware compositor of the augmented reality control circuit, the camera image pixel stream with the virtual image pixel stream includes, on a pixel-by-pixel basis, selecting a pixel from the camera image pixel stream, selecting a pixel from the virtual image pixel stream, or blending two corresponding pixels together from the camera image pixel stream and the virtual image pixel stream.

20. A video pass-through computing system, comprising:
a host computer configured to render a virtual image pixel stream; and
a head-mounted display device including:
a camera configured to image a physical scene according to an exposure timing the exposure timing defining when the camera initiates image capture of an image frame;
an augmented reality control circuit configured to:
receive a camera image pixel stream from the camera;
perform, via an image signal processing hardware pipeline of the augmented reality control circuit, sub-frame image signal processing on the camera image pixel stream to generate a processed image pixel stream,
receive the virtual image pixel stream from the host computer, wherein pixels of the camera image pixel stream are provided to the image signal processing hardware pipeline prior to corresponding pixels of the virtual image pixel stream being received by the augmented reality control circuit;
composite, via a hardware compositor of the augmented reality control circuit, the processed image pixel stream with the virtual image pixel stream to generate a display image pixel stream;
for each pixel of the virtual image pixel stream received at the hardware compositor, if a corresponding pixel of the processed image pixel stream is received not in temporal synchronization with the pixel of the virtual image pixel stream, send a command signal to the camera to adjust the exposure timing; and
a display configured to present the display image pixel stream.

* * * * *